United States Patent
Subotics

(10) Patent No.: US 6,374,887 B1
(45) Date of Patent: Apr. 23, 2002

(54) NON-PNEUMATIC, LEAF SPRING-SUPPORTED VEHICLE TIRE

(75) Inventor: Gyula Subotics, Budapest (HU)

(73) Assignee: New Tech Tire, LLC, New York, NY (US)

( * ) Notice: Subject to any disclaimer, the term of this patent is extended or adjusted under 35 U.S.C. 154(b) by 0 days.

(21) Appl. No.: 09/484,264

(22) Filed: Jan. 18, 2000

Related U.S. Application Data

(63) Continuation of application No. 09/404,796, filed on Sep. 24, 1999.

(30) Foreign Application Priority Data

Jan. 5, 1999 (HU) ............................................... 9900022
Jul. 22, 1999 (HU) ............................................... 9902483

(51) Int. Cl.$^7$ ................................................. B60C 7/14
(52) U.S. Cl. ...................................... 152/276; 152/270
(58) Field of Search ................................ 152/247, 246, 152/251, 253, 256, 258, 270, 275, 276, 277, 283

(56) References Cited

U.S. PATENT DOCUMENTS

| | | |
|---|---|---|
| 687,876 A | 12/1901 | Furlong |
| 893,655 A | 7/1908 | Rempes |
| 918,550 A | 4/1909 | Henderson |
| 1,095,955 A | 5/1914 | Beler |
| 1,113,036 A * | 10/1914 | Mitchell ........................ 152/276 |
| 1,117,481 A | 11/1914 | Clark |
| 1,164,834 A | 12/1915 | MacMillan |
| 1,217,568 A | 2/1917 | Conway |
| 1,266,852 A | 5/1918 | Pepple |
| 1,295,266 A * | 2/1919 | Bullard ......................... 152/276 |
| 1,378,832 A | 5/1921 | Babel |
| 1,412,682 A | 4/1922 | Gerome |
| 1,426,108 A | 8/1922 | Rothenberger |
| 1,441,654 A | 1/1923 | Austin |
| 1,456,775 A | 5/1923 | Hicks |
| 1,471,580 A * | 10/1923 | Walton ......................... 152/276 |
| 1,592,959 A | 7/1926 | Overman |
| 1,610,238 A * | 12/1926 | Benson ......................... 152/276 |
| 1,639,175 A | 8/1927 | Gatial |
| 1,687,206 A * | 10/1928 | Hatvani ........................ 152/276 |
| 2,055,461 A * | 9/1936 | Baddock ....................... 152/275 |
| 2,185,398 A | 1/1940 | Brunswick |
| 2,435,625 A | 2/1948 | Garcia |
| 2,584,073 A | 1/1952 | Williams |
| 2,878,853 A | 3/1959 | Williams |
| 3,730,244 A | 5/1973 | Ross |
| 3,957,101 A | 5/1976 | Ippen et al. |
| 4,108,228 A | 8/1978 | Tiemann |
| 4,121,639 A | 10/1978 | Fernandez |
| 4,230,169 A | 10/1980 | Boileau et al. |
| 4,345,633 A | 8/1982 | Gilmore |
| 4,493,355 A | 1/1985 | Ippen et al. |
| 4,934,425 A | 6/1990 | Gajewski et al. |
| 5,042,544 A | 8/1991 | Dehasse |
| 5,168,910 A | 12/1992 | Zhang et al. |

FOREIGN PATENT DOCUMENTS

| | | |
|---|---|---|
| EP | 0 200 055 | 11/1986 |
| FR | 365123 | 9/1906 |
| GB | 7280 | 10/1914 |
| GB | 1 502 808 | 3/1978 |
| WO | 92/12866 | 8/1992 |

* cited by examiner

*Primary Examiner*—Russell D. Stormer
(74) *Attorney, Agent, or Firm*—Venable; Gabor J. Kelemen

(57) ABSTRACT

A vehicle tire includes a rubber or elastomer tire body which has a circumferentially extending crown portion and opposite sidewalls joining the crown portion. The sidewalls terminate in circumferentially extending beads adapted to be received in a vehicle wheel rim. A plurality of circumferentially spaced arcuate leaf springs are, at their ends, resiliently embedded into the respective beads. The leaf springs support parts of the internal face of the crown portion.

3 Claims, 8 Drawing Sheets

NON-PNEUMATIC, LEAF SPRING-SUPPORTED VEHICLE TIRE

CROSS-REFERENCE TO RELATED APPLICATION

This application is a continuation of Application Ser. No. 09/404,796 filed Sep. 24, 1999 now abandoned.

This application claims the priority of Hungarian Patent Application No. P9900022 filed Jan. 5, 1999 and Hungarian Patent Application No. P9902483 filed Jul. 22, 1999 which are incorporated herein by reference.

BACKGROUND OF THE INVENTION

The invention relates to a vehicle tire made of an elastic material, particularly rubber or an elastomer and is provided with a crown portion and two sidewalls connected to the crown portion. Both sidewalls terminate in beads which are clamped to a wheel rim.

Vehicle tires currently in use are generally pneumatic tires, that is, the tires must contain a certain minimum air content under pressure to carry a given load. The air content is defined as the product of the tire volume and the internal pressure. The internal pressure is limited by the strength of the tire structure and the travel comfort.

Pneumatic tires have fared well in practice but are disadvantageous in that they require a very complex structural design to ensure an internal overpressure.

For containment of an internal overpressure the tire body must be reinforced with multi-layer, strength-carrying cord layers, and further, wire hoops made of multi-thread steel wire have to be embedded in the beads.

When the tire is in use, large bending, shearing, pulling and torsion stresses appear between the strength-carrying layers. For this reason such layers have to be provided with rubber layers of different physical characteristics which can resist high-frequency stresses.

Because of the internal overpressure, the vehicle tires must be provided with a special insulating layer to preserve the internal overpressure during use.

To further ensure a containment of the internal overpressure, the beads have to be made of a special material according to a special structural design and cross-sectional configuration to ensure a highly satisfactory seal along the surface which contacts the wheel rim.

A mass production of vehicle tires in accordance with the above-outlined main criteria can be realized only with a series of complicated machine tools which involve a substantial investment and which utilize expensive structural materials and require a costly quality control system.

Various solutions are known particularly for simplifying the manufacturing technology and for producing a more economical product while fully or partially retaining the functional principle of pneumatic tires operating with overpressure.

United Kingdom Patent No. 1,502,808 discloses a structural formation and a manufacturing process of cordless injection-molded pneumatic tires made of an elastomer having a high modulus of elasticity for the purpose of simplifying and rendering less expensive the material structure of pneumatic tires as well as for simplifying the related manufacturing technology.

U.S. Pat. No. 4,230,169 discloses a pneumatic tire which is made of an elastic material without carcass reinforcement and which is provided with a crown portion and sidewalls. Each sidewall terminates in a bead, and the parts between the sidewalls and the crown portion contain an annular thickening or bulge whose strength in the circumferential direction is higher than the strength of adjacent parts, given the fact that the annular thickening or bulge is made of a fibrous material or steel cable.

Load carrying and resilient characteristics of each of the above-mentioned solutions are determined by the overpressure of the air contained within the tire. Such tires are not failure proof, since, if internal air escapes during operation, the tread contour flattens under the load and the vehicle becomes unsteerable. According to an additional drawback of the outlined solutions the tire strength diminishes due to the omission of one part of the cord layers, whereas the overpressure required for ensuring satisfactory load carrying properties and operation cannot be reduced substantially in comparison with conventional vehicle tires. Consequently, tires involving any of the above-outlined solutions have a lower operational safety than traditional tires having embedded cord layers.

Published International Application No. WO 92/12866 discloses a vehicle tire that is made of rubber, preferably of polyurethane elastomer, and has no strength-carrying cord layers, but is provided, under the crown portion, with a belt made of a shock-proof, highly rigid and high-strength material. This solution, while it presents a major milestone by eliminating the disadvantages of previous solutions, has the drawback that the mass manufacture of the sole belt to be mounted under the crown portion is expensive and the substantial mass of the belt results in an appreciable mass increase of the entire vehicle tire.

SUMMARY OF THE INVENTION

It is an object of the invention to provide an improved tire which constitutes a further development over the solution disclosed in the International Application No. WO 92/12866 in order to produce a vehicle tire which can be manufactured in a simpler and more economical way, which is characterized by higher lateral stability, lower mass and which is completely puncture-proof.

The invention is based on the recognition that the rolling characteristics and load bearing capacity of the tire as well as the travel comfort on board of the vehicle can be fully ensured without the application of internal overpressure, if the required flexibility of the tire is ensured by suitably positioned springs.

For achieving the proposed solution, the invention provides a tire which is of an elastic material, preferably rubber or an elastomer, and is provided with a crown portion and sidewalls adjacent to the crown portion, wherein both sidewalls terminate in beads by which the tire is mounted on a wheel rim in a pre-stressed (biased) state. In accordance with the invention, the internal surface of the crown portion is supported by arcuately bent leaf springs arranged at specified distances. The individual leaf springs are positioned to connect the two beads with one another and the leaf spring ends are flexibly embedded in the beads. The beads, in turn, are held in a wheel rim in a pre-stressed state.

According to a further advantageous feature of the invention, at least one belt ring having at least one layer is centrally mounted in the crown portion.

According to a further advantageous feature of the invention, a support, which is preferably of flexible material, is centrally positioned on the wheel rim under the leaf springs.

According to a further advantageous feature of the invention, the inner surface of the crown portion is provided with troughs between which stiffening ribs supported by the leaf springs are situated.

According to a further advantageous feature of the invention, the central line of the stiffening ribs situated between the troughs forms an angle $\alpha=90°$ with the crown portion line in the symmetry plane of the tire and, proceeding towards to sidewalls, the angle $\alpha$ diminishes to an angle $\alpha^1$, wherein $$60°<\alpha^1<\alpha=90°.$$

According to a further advantageous feature of the invention, the stiffening ribs are situated in the vehicle tire at uniform distances from each other and are disposed such that a plane containing the center of gravity of the vehicle tire and the central line of the respective stiffening rib, forms, in the case of each stiffening rib, an identical angle $\beta$ with the symmetry plane perpendicular to the rotary axis of the vehicle tire, wherein $$60°<\beta<120°.$$

According to a further advantageous feature of the invention stiffening cross ribs are provided which interconnect the stiffening ribs.

According to a further advantageous feature of the invention the beads are provided with troughs which are spaced at specified distances from each other and which clamp the edge of the wheel rim horn.

According to a further advantageous feature of the invention, the sidewalls are provided with protective beads externally covering the wheel rim horns.

According to a further advantageous feature of the invention the leaf springs have thickened, arcuate ends, and the beads have slots which receive the arcuate ends and have arcuate surfaces abutting the arcuate ends of the leaf springs.

According to a further advantageous feature of the invention at least one reinforcement ring is embedded in the sidewalls of the vehicle tire.

DESCRIPTION OF THE PREFERRED EMBODIMENTS

Figure 1:
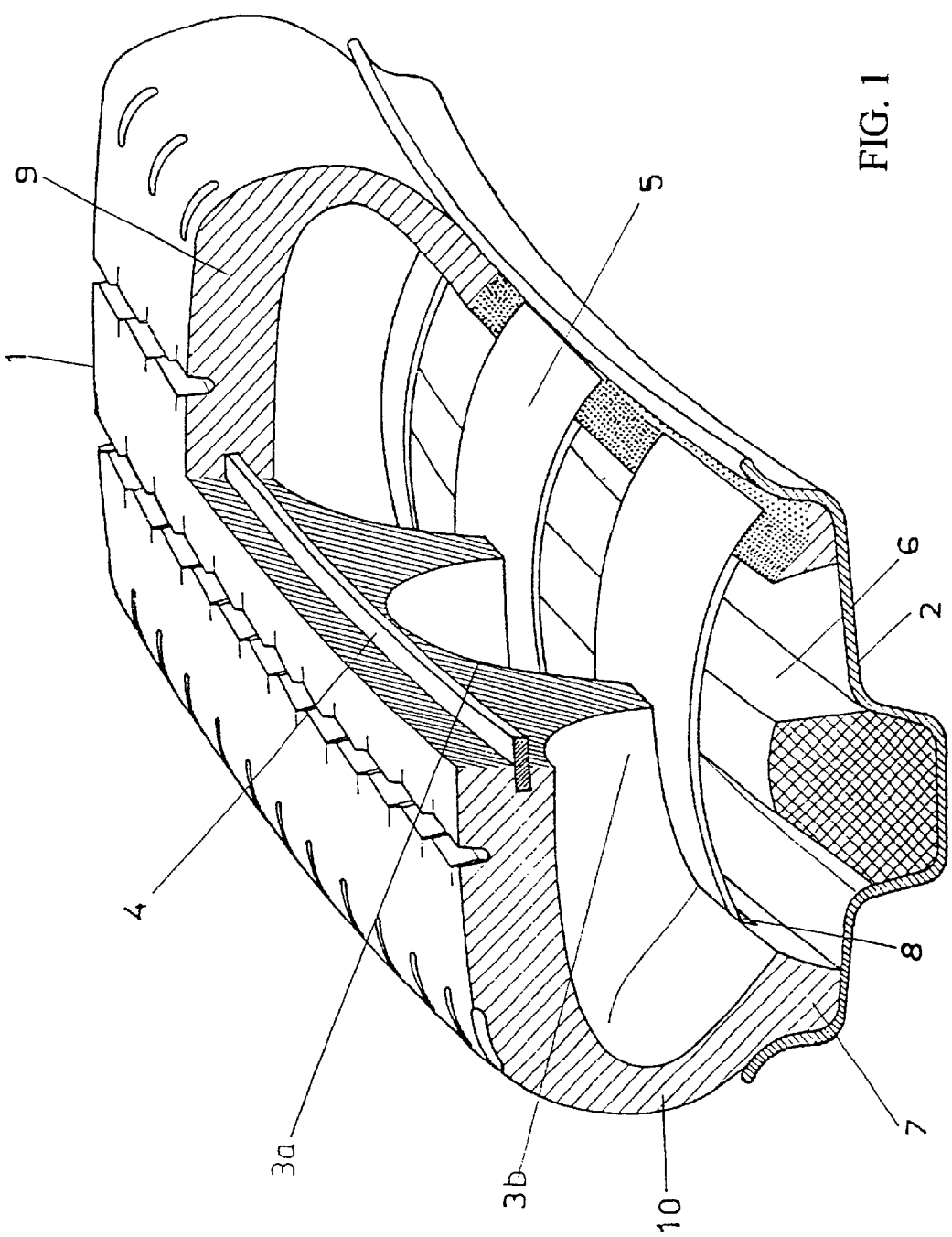
FIG. 1 is a perspective, fragmentary, partially sectional view of a preferred embodiment of the tire according to the invention, shown mounted on a wheel rim.

FIG. 1 depicts a vehicle tire body 1 according to the invention, made of an elastic material, preferably rubber, and vulcanized in a mold. The tire body 1 is composed of a crown portion 9, adjacent sidewalls 10 and beads 7 formed on the ends of sidewalls 10. A belt ring 4 is embedded in the crown portion 9 under the tread. The belt ring 4 is made of a high-strength material of at least 100 kp/mm², for example steel or Kevlar and is characterized by a low bending rigidity of maximum 1×10⁶ mm² kp. The belt ring 4 which may be a single-layer or a multi-layer structure, has several functions:

In the case of a high travelling speed the belt ring 4 protects the vehicle tire 1 from the stretching effect of centrifugal forces;

The belt ring 4 evenly distributes the load on the crown portion 9 to the leaf springs 5;

The belt ring 4 allows, by means of the leaf springs 5, the vehicle tire to be mounted on the wheel rim 2 with an appropriate bias to ensure that the beads 7 do not slip on the wheel rim 2 despite the fact that they are not provided with bead wire rings.

The internal boundary surface of crown portion 9 oriented toward the wheel rim 2 is provided with transverse troughs 3a spaced circumferentially at specified (for example, uniform) distances from one another. In this manner between every two adjoining troughs 3a stiffening ribs 3b are defined which interconnect the crown portion 9, the sidewalls 10 and the beads 7. The stiffening ribs 3b are supported by arcuately bent leaf springs 5, the endings of which are resiliently embedded in the beads 7. The leaf springs 5 are situated along the internal boundary surface of the crown portion 9 at specified intervals; for example, in the case of leaf springs made of 30 mm wide and 1.5 mm thick spring steel, the spacing is expediently at least 3 mm between adjoining leaf springs.

Terminal portions of the leaf springs 5 are received in slots 8 formed in the beads 7 and thus are embedded in rubber. As a result, the leaf springs 5 are capable of ensuring in a superior manner the resilient characteristics of vehicle tire 1, even in the absence of an appropriate amount of internal air content which is indispensable in the case of vehicle tires having a carcass reinforcement. In addition, the leaf springs 5 also play a decisive role in affecting the operating characteristics of the vehicle, for example, in ensuring road holding properties. The leaf springs 5 have the following main functions:

They ensure a suitable springing property for the tire 1;

In response to load, the leaf springs 5 press both beads 7 against the wheel rim to thus prevent slippage of vehicle tire 1 on the wheel rim 2;

The leaf springs 5 cool the crown portion 9, since at higher speed centrifugal forces effect an air flow against the leaf springs 5 of that portion of the cooled air within the tire 1 which is in contact with the wheel rim.

As a result of the cool air flow, the cooled leaf springs 5 have a cooling effect on the rubber material which forms the crown portion 9 and which is exposed to dynamic loads which generate heat. As a result, the operating temperature of the rubber tires according to the invention is lower than the operating temperature of pneumatic tires that contain cord layers. The lower operating temperature is beneficial in slowing the aging process of the rubber.

A support 6, for example a rubber or elastomer ring, is mounted under the leaf springs 5 on the wheel rim 2. The support 6, in case the vehicle is overloaded, protects the leaf springs 5 from deformations beyond their elastic limit. The symmetry plane of the support 6 coincides with the symmetry plane of the tire, that is, its halving plane oriented perpendicularly to the rotary tire axis.

The structure of the tire 1 in accordance with the invention allows a substantial reduction in the profile ratio, that is, the ratio of profile height to the profile width, thus diminishing the rolling resistance, improving the force transmission between the wheel rim 2 and road surface, permitting a higher operating speed and enhancing travel safety.

In conventional, carcass-type tires, bending, shearing, pulling and torsion stresses occur as a result of cyclical deformations during operation, affecting the rubber layers situated between the cord threads of overlapping cord layers. Such stresses do not occur in the tires according to the invention since a carcass is entirely absent therefrom. Consequently, heat generation in the layers under the crown portion 9 is reduced and therefore the operating temperature of vehicle tires is less.

Figure 2:
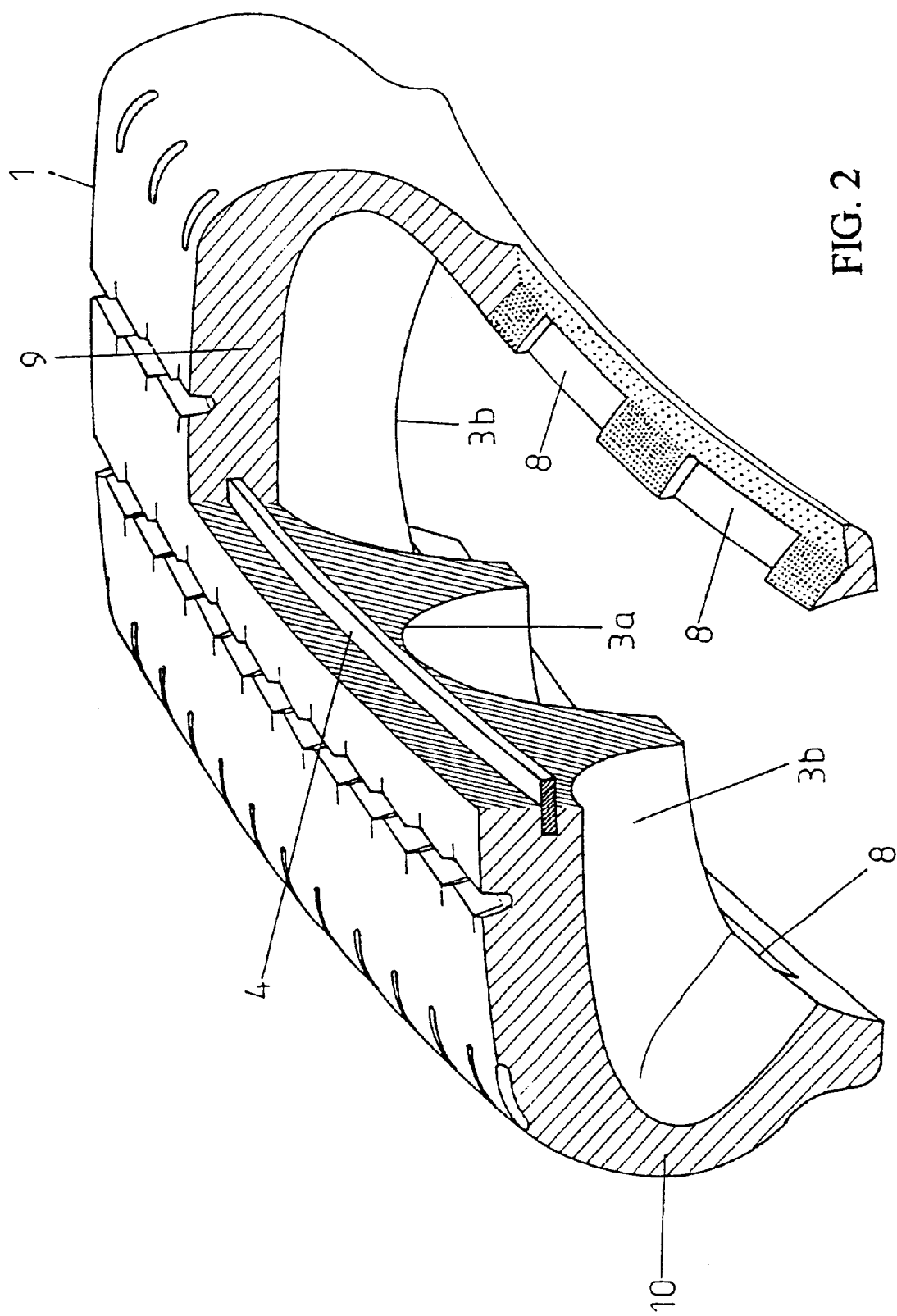
FIG. 2 is a view similar to FIG. 1 showing the flexible vehicle tire body.

FIG. 2 is similar to FIG. 1, showing the tire body 1 without the leaf springs 5, the wheel rim 2 and the rubber ring 6. The tire body 1 shown in FIG. 2 may be made in a mold using press technology or may be manufactured by injection molding. Since the tire body 1 shown in FIG. 2 does not contain bead wire rings and a carcass, only the belt ring 4 has to be embedded in the crown portion 9. Moreover, since the tire may be designed with a profile height that is less than that of traditional vehicle tires, all manufacturing procedures are simplified and thus reduced to vulcanizing the tire in a mold. Consequently, the vulcanizing tool is also substantially simplified compared to vulcanizing tools needed for traditional tires, since in making the tire according to the invention, both external and internal mold parts can be made of metal, and the elastic material, such as a rubber mixture, can be introduced into the cavity formed by the metal molds, for example by injection molding. In such a vulcanization technique the heating of external and internal mold parts can be performed in many ways, for example by inserting electric heating panels or by dissipation heat transfer by a heating medium introduced in the heating chambers. Since both the external and internal mold parts can be made of metal, a mass distribution of the end product can be precisely planned in advance and such mass distribution of the end product cannot deviate from the pre-planned data. Accurate compliance with the planned mass distribution is especially important in the case of vehicle tires travelling at a high speed.

Figure 3:
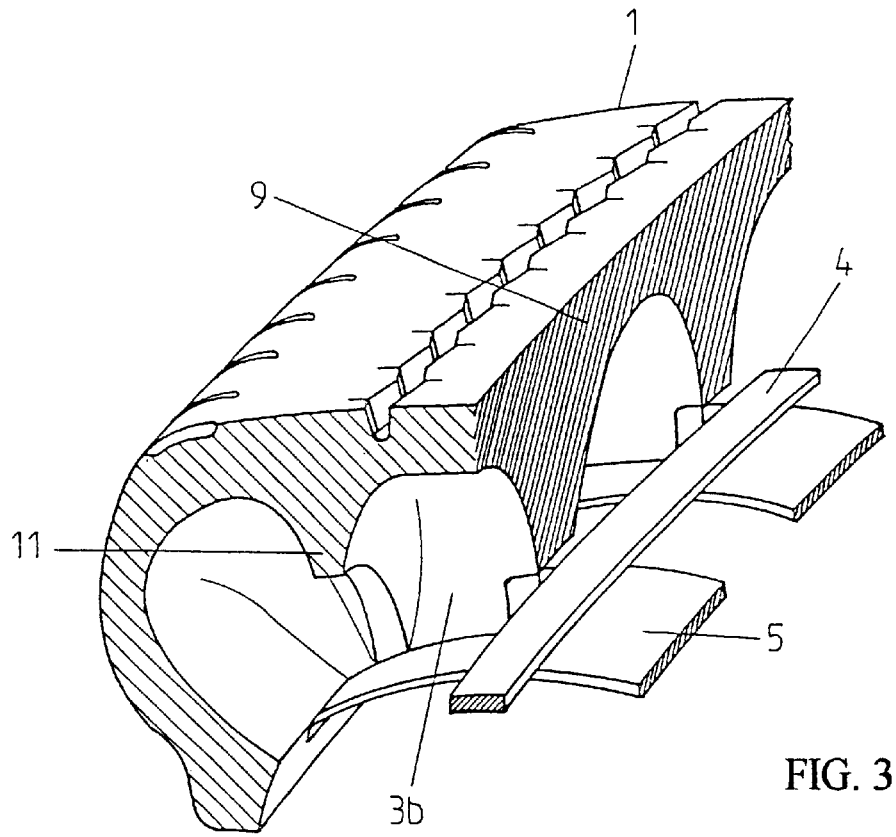
FIG. 3 is a perspective, fragmentary, partially sectional view of another preferred embodiment of the tire according to the invention.

FIG. 3 shows a section of a segment of the vehicle tire and illustrates that the stiffening ribs 3b supported by the leaf springs 5 are connected by cross ribs 11 formed in the lower surface area of crown portion 9. Such a structure provides that the wall thickness of the crown portion 9 can now be substantially reduced without adversely affecting the load bearing capacity and the operating characteristics of the tire. The belt ring 4 is mounted between the leaf springs 5 and the tire body at the time the tire body is fastened to the wheel rim 2. Such a solution further simplifies the making of the tire, since the belt ring 4 is not mounted in the flexible tire body. The belt ring 4 provides for a comfortable springing action, especially in the case of cars travelling at low speed.

Figure 4:
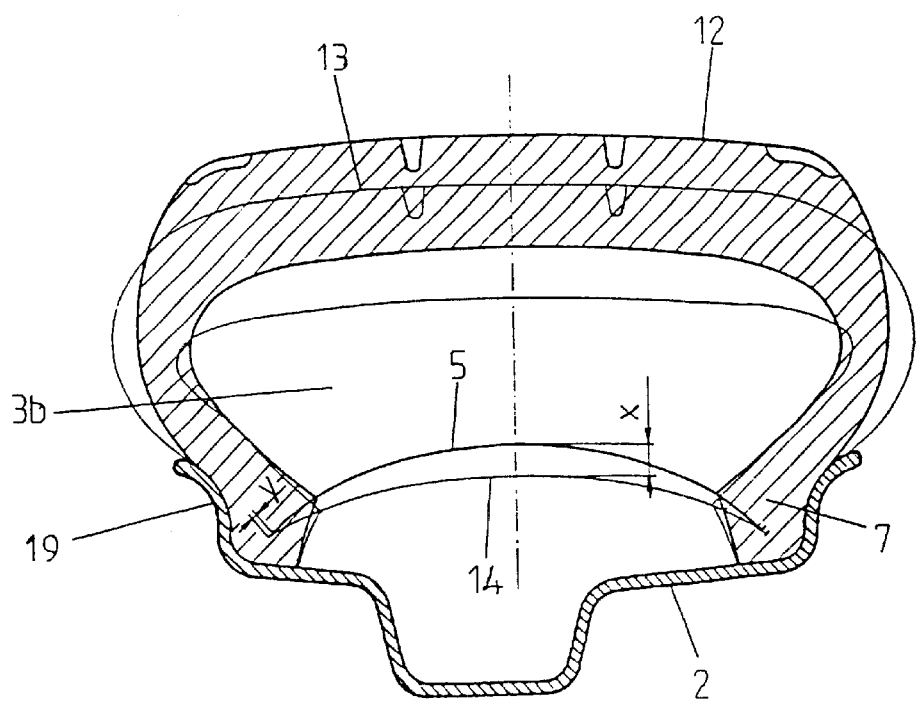
FIG. 4 is a sectional view of a preferred embodiment of the tire according to the invention, shown mounted on a wheel rim.

FIG. 4 depicts a section of the vehicle tire 1 mounted on the wheel rim 2. As indicated, the external profile circle 12 of the vehicle tire 1 flattens under load and, as a result, assumes a profile circle (13). Also as a result of load, the leaf springs 5 are deformed to assume a flatter configuration, designated at 14. The deformation x of the leaf spring 5 resulting from load causes a displacement y of the ends of the leaf spring 5, as a result of which the beads 7 increasingly press against the wheel rim collar and wheel rim horn 19. This prevents the tire 1 from slipping on the wheel rim 2.

Figure 5:
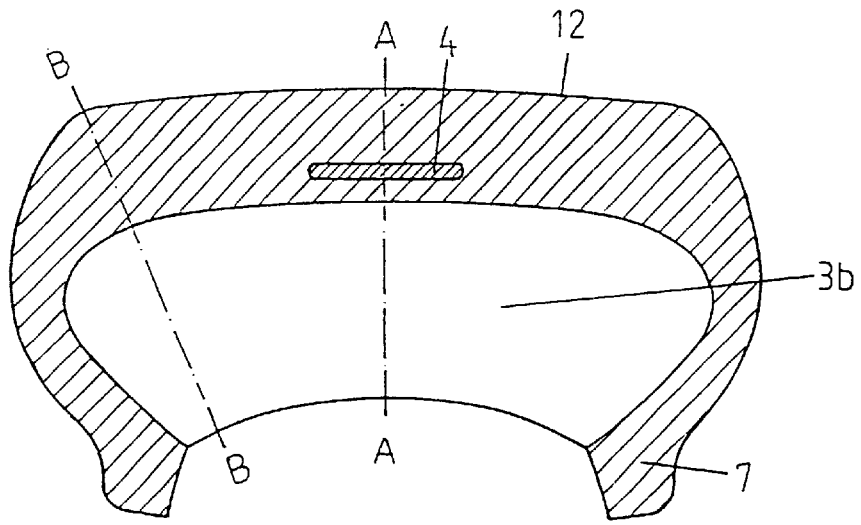
FIG. 5 is a sectional view of a preferred embodiment of the tire according to the invention.

FIG. 5 depicts a section of the tire according to the invention showing that the stiffening rib 3b as viewed in section VII—VII (FIG. 7) forms an angle of 90° with the crown line. It is to be understood that such an angle may be other than 90° to advantageously affect the travelling properties of the tire. For example, the rolling resistance may be further reduced and the load bearing capacity further increased.

Figures 6, 7:
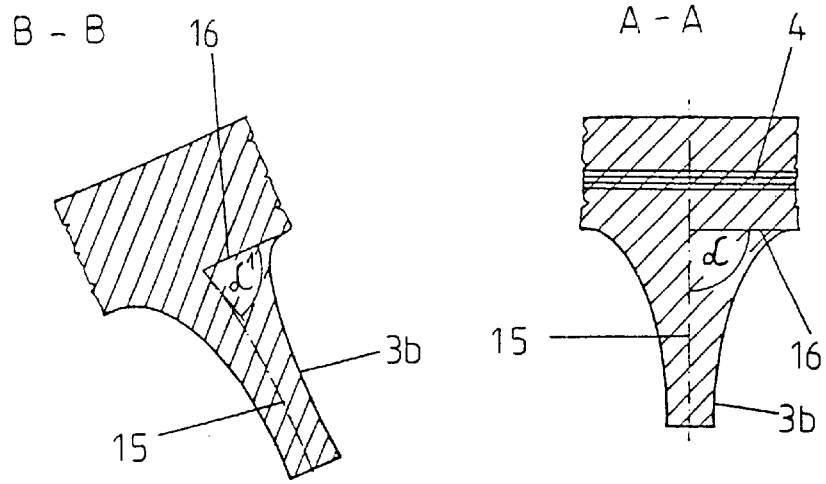
FIG. 6 is a sectional view taken along line VI—VI of FIG. 5.
FIG. 7 is a sectional view taken along line VII—VII of FIG. 5.

FIG. 6 shows the section VI—VI and FIG. 7 shows the section VII—VII of the stiffening rib 3b illustrated in FIG. 5. The central line 15 of the stiffening rib 3b shown in FIG. 7 forms an angle $\alpha=90°$ with the crown portion line 16. In this arrangement, as a result of load, the stiffening rib 3b is compressed as a rubber spring and upon removal of load it resiliently assumes its original shape. In the FIG. 6 arrangement the central line 15 of stiffening rib 3b forms an angle $\alpha^1<90°$ with the crown portion line 16. In this way two kinds of elastic deformation takes place as a result of load, i.e. compression and bending. By an appropriate selection of the angle $\alpha^1$ the measure of springing can be set as required.

Figures 8, 9, 10:
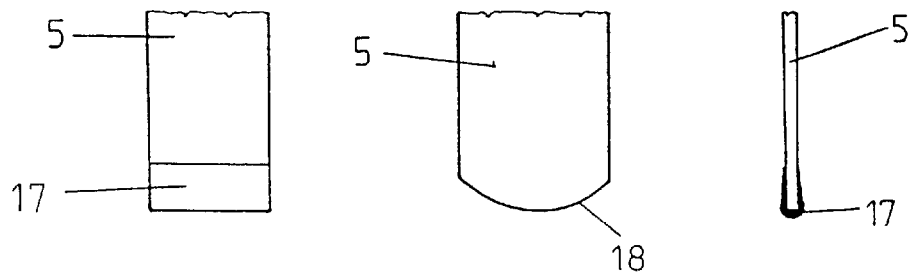
FIG. 8 is a top plan view of an embodiment of a thickened end portion of a leaf spring forming part of the tire structure.
FIG. 9 is a top plan view of an embodiment of an arcuate end portion of a leaf spring forming part of the tire structure.
FIG. 10 is a sectional side elevational view of a thickened end portion of a leaf spring forming part of the tire structure.

FIGS. 8, 9 and 10 depict various embodiments of the ends of the leaf spring 5. If springing is to be stiffened, the leaf spring ends are thickened as indicated in FIGS. 8 and 10. A thickening 17 of the leaf spring ends may be achieved, for example, by metal or plastic inserts.

In the FIG. 9 construction the leaf spring 5 is provided with an arcuate terminal edge 18 which softens the springing action. In case the slot 8 (FIG. 2) which receives the spring end is also arcuate, the extent of springing can be set as required by a suitable selection of the radius of curvature of the two complemental arches. Further, by providing a suitable curvature for the terminal edges of the leaf springs, the setting of the necessary bias for mounting the tire on the wheel rim is facilitated.

Figure 11:
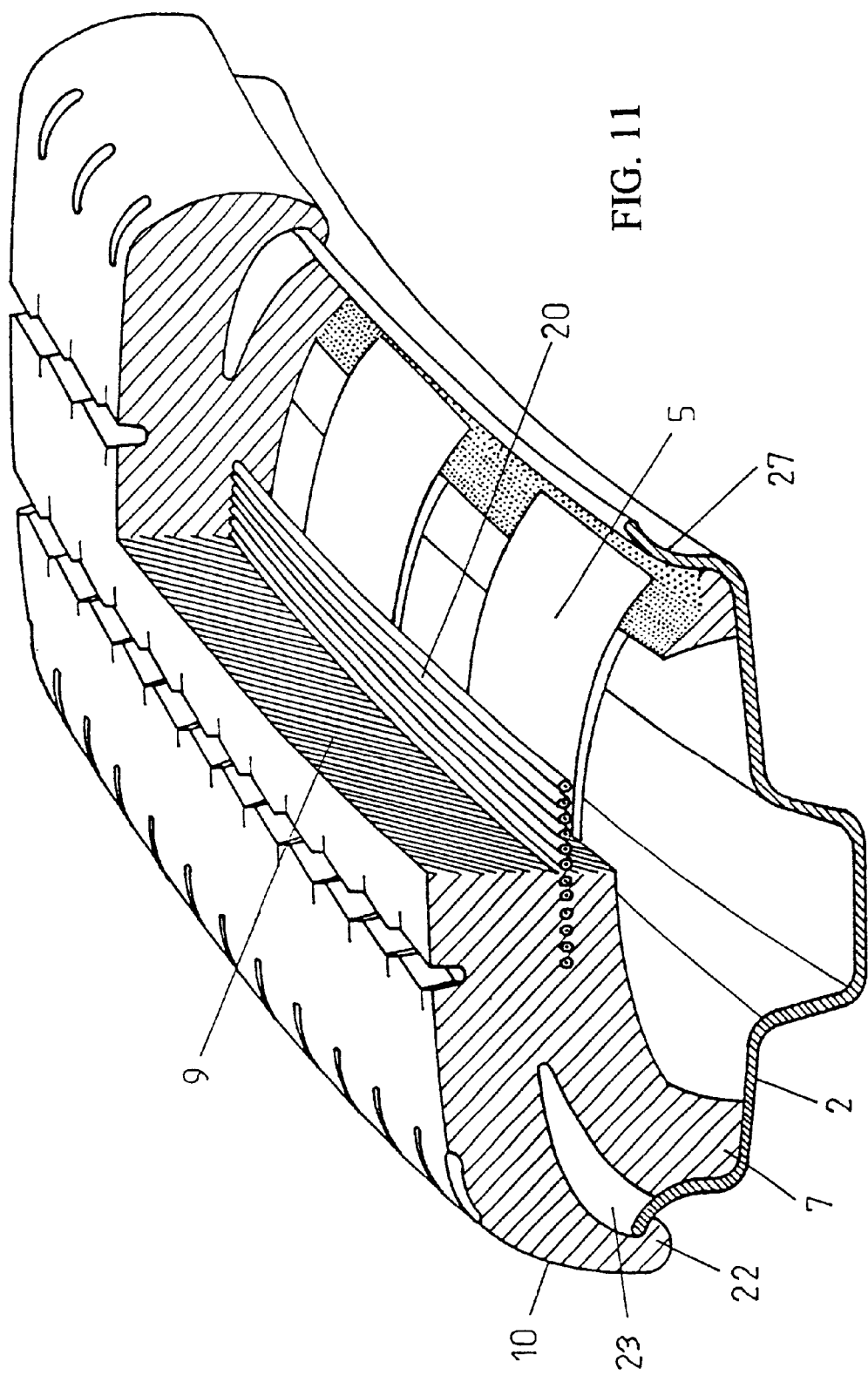
FIG. 11 is a perspective, fragmentary, partially sectional view of another preferred embodiment of the tire according to the invention, shown mounted on a wheel rim.

FIG. 11 shows an elastic vehicle tire (preferably of rubber) which is vulcanized in a mold. A belt 20 composed, for example, of high-strength cord threads or steel cable, is embedded in the crown portion 9, underneath the tread. Further, in the beads 7 under the sidewall 10 depressions 23 are formed which may be uniformly spaced. The depressions 23 receive the edge of the wheel rim horn 27. The sidewalls 10 are provided with a protective bead 22 which externally covers the wheel rim horn 27. In this embodiment too, the crown portion 9 is supported internally by leaf springs 5, whose ends are resiliently fixed in beads 7. As indicated on FIG. 12, ribs 21 separate the depressions 23 from one another. The ribs 21 ensure the resilience of the tire in the zone above wheel rim horns 27. In the case of rubber ribs having a width of 10 mm and a height of 15 mm, the spacing between the ribs is expediently at least 5 mm wide.

Figure 12:
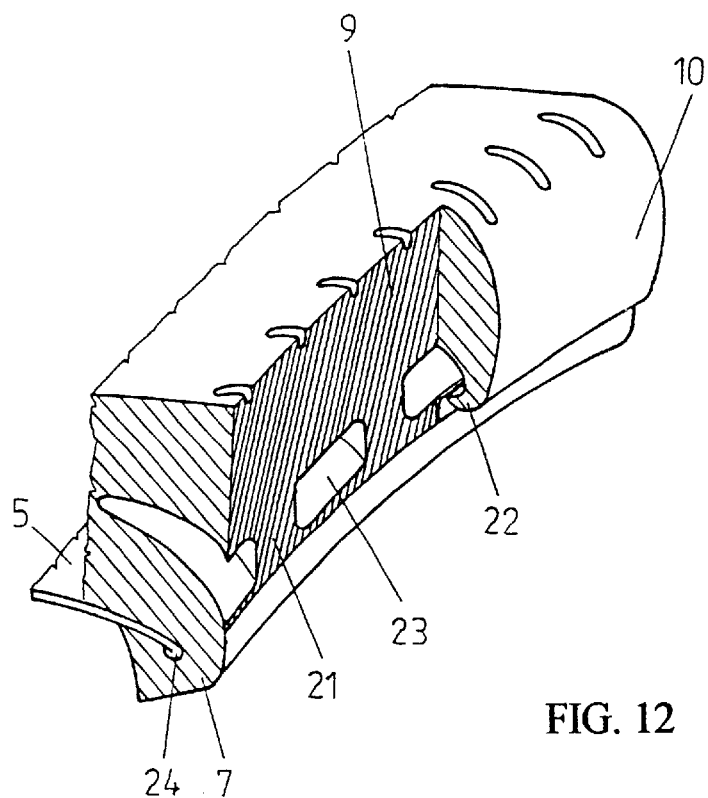
FIG. 12 is a perspective, fragmentary, partially sectional view of a sidewall of the tire according to the invention.

FIG. 12 shows a preferred embodiment of ribs 21 and troughs 23 of the tire 1 of FIG. 11. The ribs 21 and the troughs 23 are disposed above the wheel rim horn 27. The ends 24 of the leaf springs 5 are folded back to thus provide thickened end portions. As a result of such a structure, the curvature of the leaf spring 5 can only change under a higher load, since the spring ends 24, due to their enlarged cross section, can deform, under a higher load, only that part of the rubber bead 7 which extends to the wheel rim horn 27.

Figure 13:
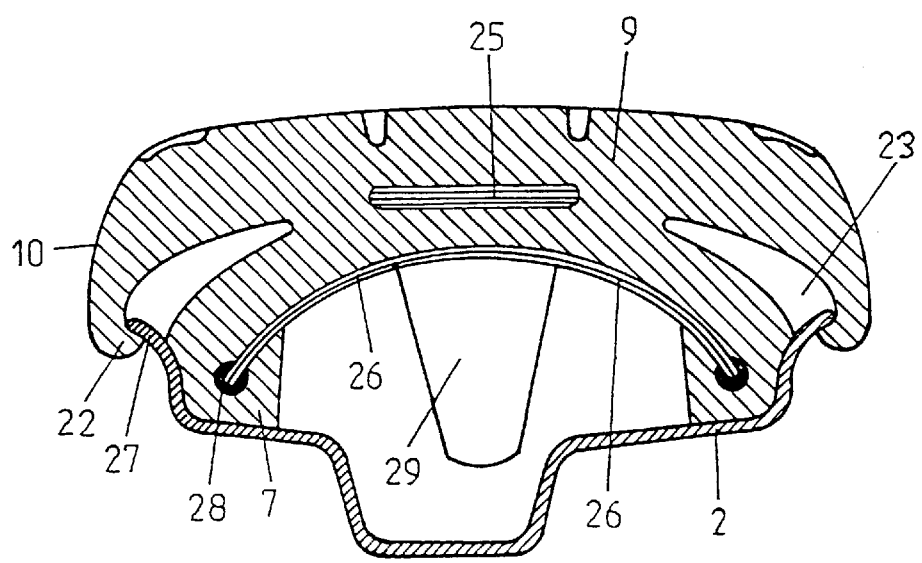
FIG. 13 is a sectional view of another preferred embodiment of the tire according to the invention, shown mounted on a wheel rim.

The embodiment shown in FIG. 13 is similar to that of FIG. 11, except that a multi-layer belt 25 is embedded in the crown portion 9, and further, multi-layer leaf springs 26 are arranged between the two beads 7, ensuring a higher dynamic load capacity of the tire. Buffers 29 integral with the crown portion 9 or glued or mechanically joined to the internal surface of the crown portion 9 also improve the load bearing capacity of the tire 1. This is so, because in response to a higher load, the buffer 29 abuts the wheel rim 2 and deforms elastically. In this construction a thickened portion 28 is fastened to the ends of the leaf springs 26.

Figure 14:
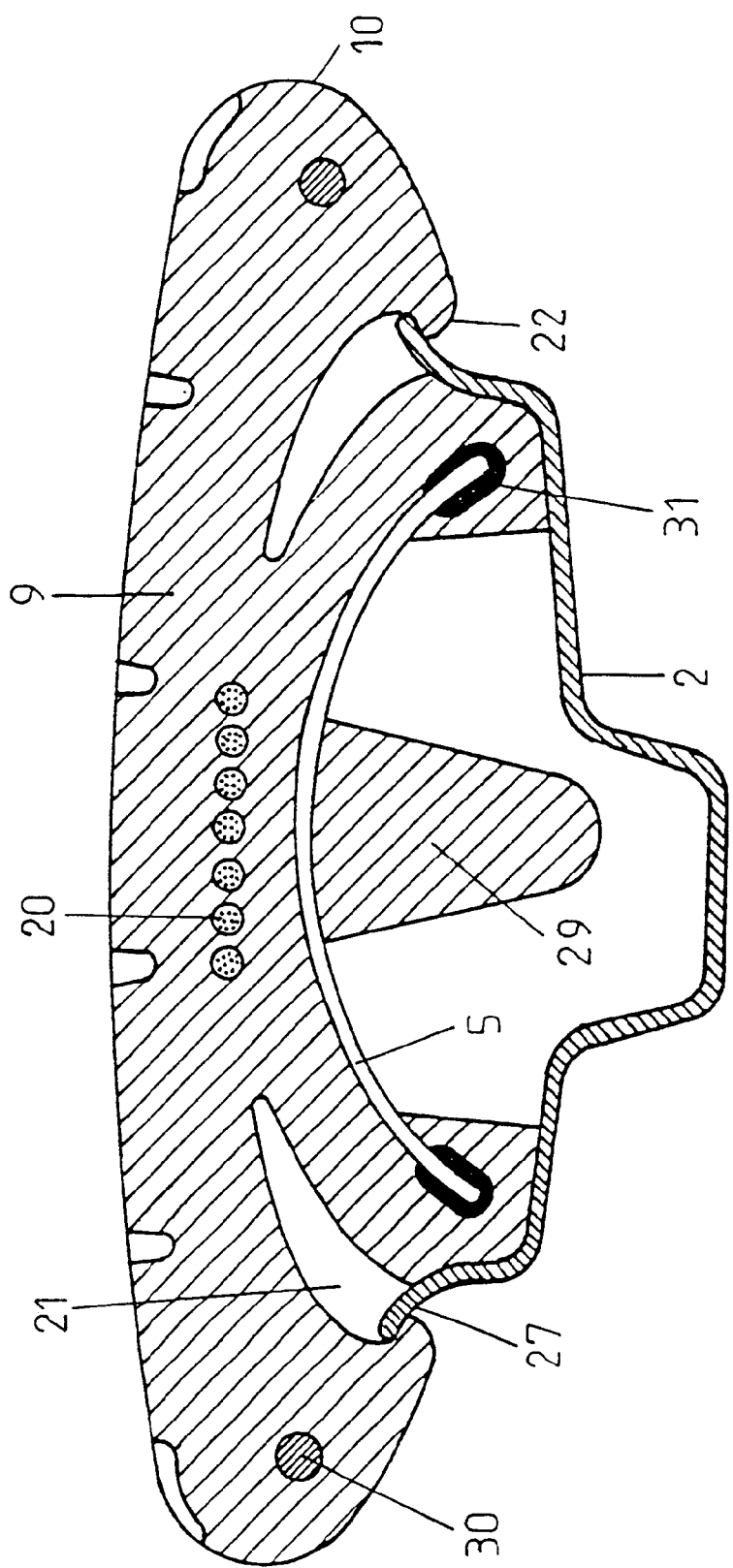
FIG. 14 is a sectional view of another preferred embodiment of a wide-profile tire according to the invention, shown mounted on a wheel rim.

FIG. 14 shows a wide-profile vehicle tire, similarly to FIG. 11. Load bearing along the full width of the tread of the tire of increased profile width is ensured by the fact that in that tire region which projects beyond the wheel rim horn 27 one or more reinforcement rings 30 are symmetrically embedded. The reinforcement rings 30 are made of a material which is highly resistant to bending (preferably at least $5 \times 10^6$ mm² kp) and which has a high tensile strength (preferably at least 400 Mpa). The ends of the leaf springs 5 are provided with load distributing sliding thickened portions 31.

Figure 15:
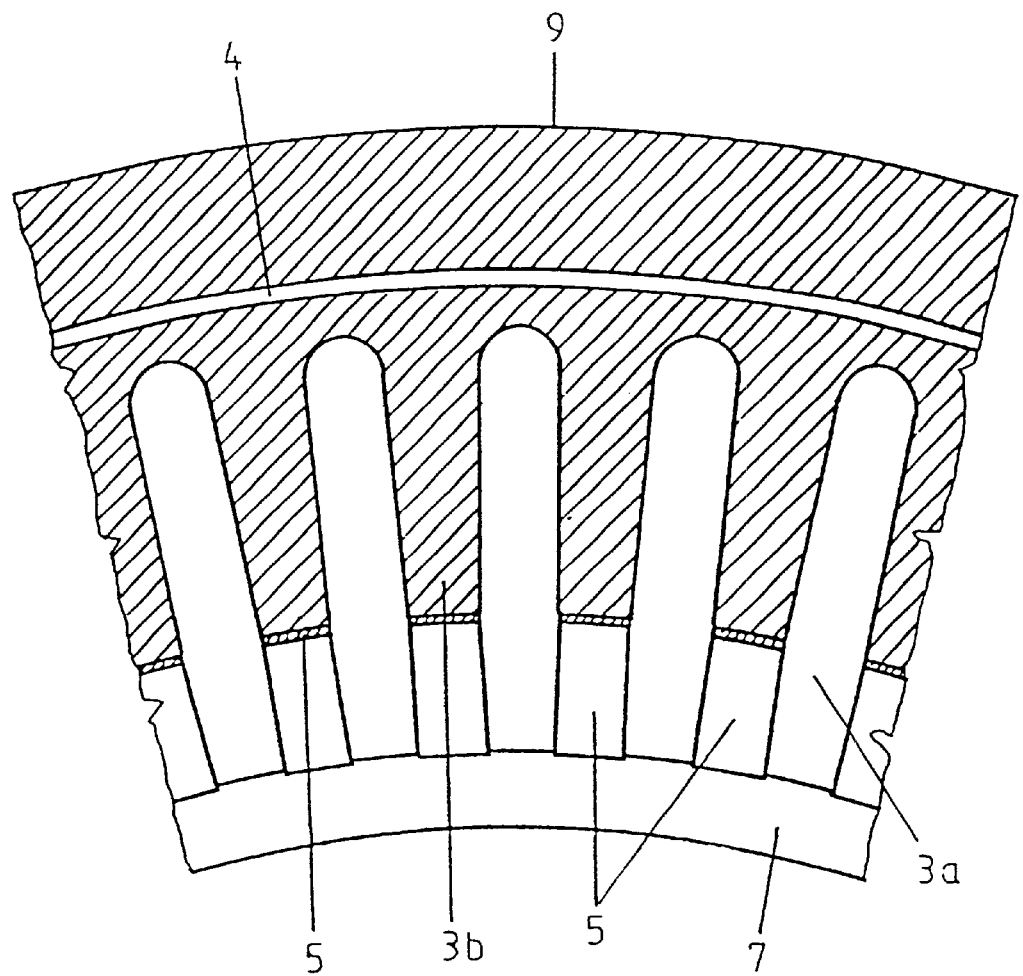
FIG. 15 is a fragmentary radial sectional view of yet another preferred embodiment of the tire according to the invention.

FIG. 15 illustrates a vehicle tire similar to the first-described embodiment. It has, however, a higher load bearing capacity, made possible by a more dense arrangement of the stiffening ribs 3b and narrower troughs 23. For example, if the spring steel leaf springs have a width of 10 mm and a thickness of 1 mm, the stiffening ribs preferably have a width of 10 mm and the troughs between ribs preferably have a width of at least 10 mm.

The most significant advantageous properties of the tire in accordance of the invention will be set forth below.

Since the tire according to the invention functions without internal overpressure, puncturing of the tire does not affect its operating characteristics.

The tire requires simple manufacturing technology with modest investment of machinery. The tire may be mass-manufactured by applying vulcanization pressing technology and using simple metal pressing tools, or may be made by injection molding.

The tire can be made at low cost. Production costs are reduced substantially, since the manufacturing technology is significantly simplified. Also, the tire structure is simplified, since instead of more expensive structural materials essential for conventional tires, such as high-strength cord layers, bead wire rings and rubber parts of special characteristics, much cheaper structural materials are used.

Production costs are further reduced by the high-level mechanization of the manufacturing process, whereby the number of factory hands required for the manufacturing process can be substantially reduced.

The tire according to the invention may be manufactured with a greater reliability of quality. As a result of changes and simplification in the manufacturing technology and product structure, instead of the several hundreds of parameters to be verified and tested in the case of traditional tires, only a few parameters need to be continuously monitored for compliance to reliably ensure an excellent product quality.

Due to the high level of mechanization, human factors will have a lower influence on product quality than in the case of traditional vehicle tires.

The tire according to the invention also has a number of advantages for the consumer:

The internal tire pressure does not have to be constantly verified;

No spare tire has to be carried in the car;

A better springing action (shock absorption) and greater travel comfort are ensured as compared to traditional vehicle tires.

The tire according to the invention is also advantageous as concerns the environmental protection, as it does not contain a fabric carcass and bead wire rings. Consequently, rubber can be recycled and reclaimed from used tires easier and in better quality, thus greatly facilitating re-use of regenerated products.

Another indirect advantage resides in the fact that the manufacturing of the tire in accordance with the invention consumes less energy than the making of traditional tires, resulting in a reduction of environmental pollution.

It will be understood that the above description of the present invention is susceptible to various modifications, changes and adaptations, and the same are intended to be comprehended within the meaning and range of equivalents of the appended claims.

What is claimed is:

1. A vehicle tire comprising
    (a) a tire body of a material selected from the group consisting of rubber and an elastomer; said tire body including
        (1) a circumferentially extending crown portion having an external face and an internal face;
        (2) circumferentially extending first and second sidewalls joining said crown portion; said first and second sidewalls terminating in circumferentially extending first and second beads, respectively; said first and second beads being adapted to be received in a vehicle wheel rim; and
        (3) a plurality of circumferentially spaced stiffening ribs; each said rib interconnecting said crown portion and said first and second sidewalls; and
    (b) a plurality of circumferentially spaced arcuate leaf springs each having opposite first and second ends resiliently embedded into respective said first and second beads; said leaf springs supporting said ribs at rib surfaces forming part of said internal face of said crown portion.

2. The vehicle tire as defined in claim 1, wherein said tire body has a central symmetry plane, said crown portion has a crown line and each said stiffening rib has a central line; further wherein said center line of each said stiffening rib forms an angle with said crown line; in said symmetry plane said angle being $\alpha=90°$ and viewed toward said side walls from said symmetry plane said angle decreasing to $\alpha^1$, wherein $60°<\alpha^1<90°$.

3. The vehicle tire as defined in claim 1, wherein said vehicle tire has a center of gravity, an axis of rotation and a symmetry plane oriented perpendicularly to said axis of rotation and each said stiffening rib has a central line; said stiffening ribs being uniformly spaced from one another; imaginary planes containing said center of gravity and said center line of respective said stiffening ribs form identical angles $\beta$ with said symmetry plane; and further wherein $60°<\beta<120°$.

* * * * *